Oct. 5, 1965 S. D. HARRIS 3,209,878
MOVABLE CHUTE DEFLECTOR FOR SILOS
Filed July 26, 1963 2 Sheets-Sheet 1
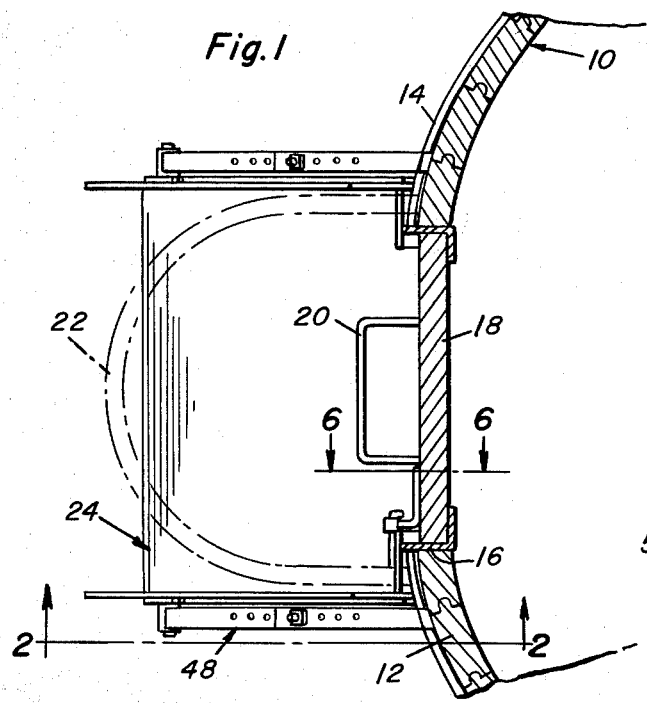
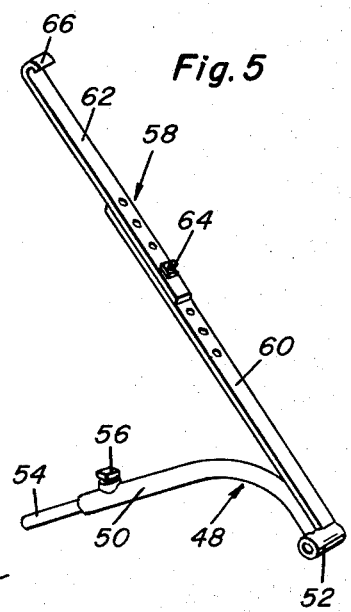
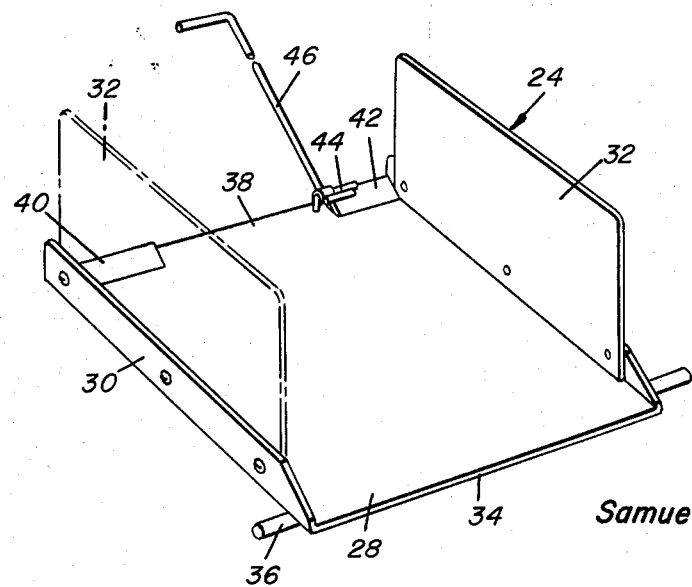
Samuel D. Harris
INVENTOR.

Oct. 5, 1965  S. D. HARRIS  3,209,878
MOVABLE CHUTE DEFLECTOR FOR SILOS
Filed July 26, 1963  2 Sheets-Sheet 2
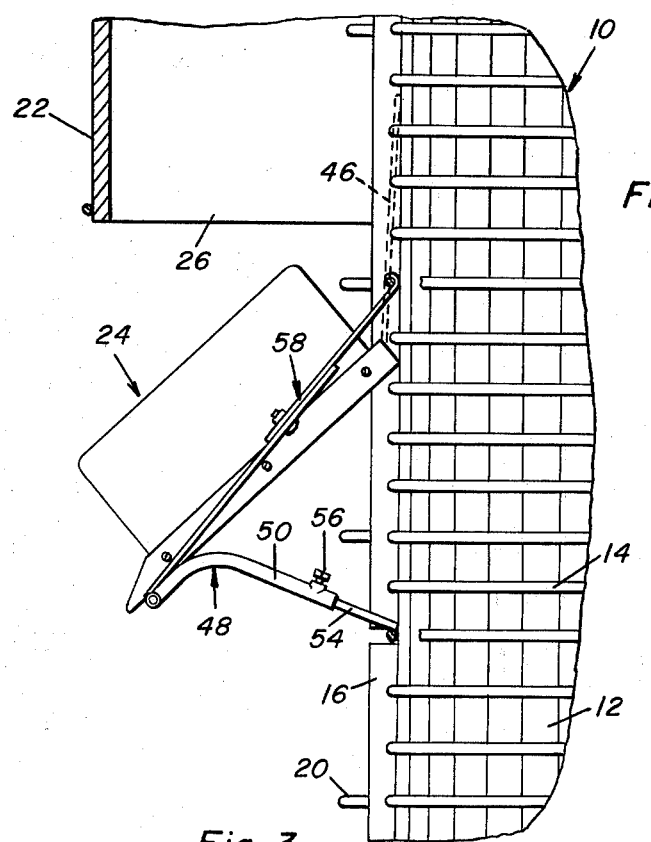
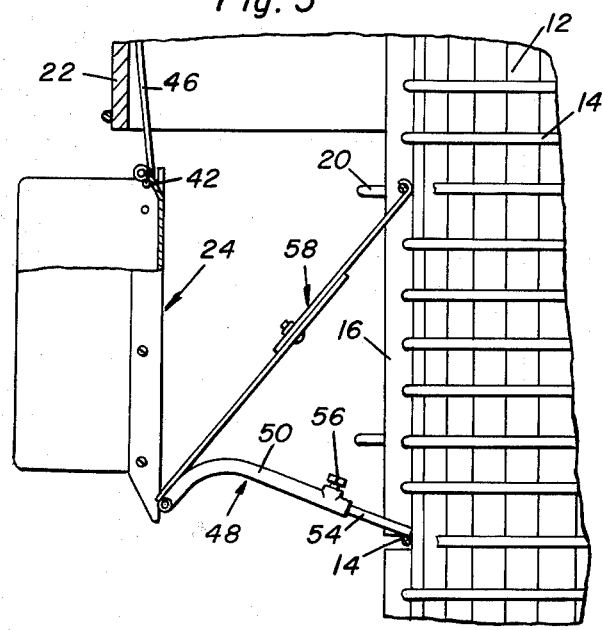
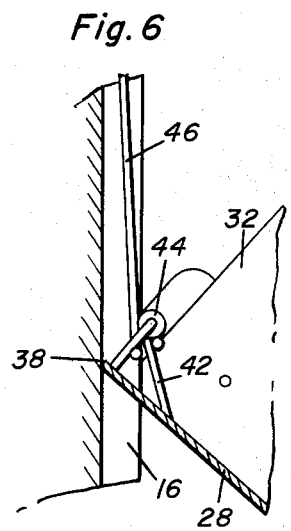
Samuel D. Harris United States Patent Office 3,209,878
Patented Oct. 5, 1965

3,209,878
MOVABLE CHUTE DEFLECTOR FOR SILOS
Samuel D. Harris, Box 250-B, Mineral, Va.
Filed July 26, 1963, Ser. No. 297,904
1 Claim. (Cl. 193—17)

This invention relates to improvements to silo structures within which silage matter is stored.

More particularly, the present invention relates to an attachment for silos provided with vertical silage chutes that enclose a vertical wall section of the silo on which there are mounted ladder rungs and removable doors at spaced levels so as to provide access into the silo at any desired height. The attachment of the present invention therefore, is concerned with the deflection of silage that is dispensed through the silage chute whereby the silage may be deposited at a location spaced from the silo.

It is therefore a primary object of the present invention to provide a silage deflector associated with a silo mounted silage chute which is supported in such a manner as to permit its displacement to an inactive position spaced from the silo whereby passage into the silage chute is unblocked so as to permit a person to climb or descend the ladder rungs of the vertical wall section without any assistance in moving the deflector between a deflecting and an inactive position from either above or below the deflector.

In accordance with the foregoing object, the present invention features adjustably extensible pivot supporting facilities for a deflector pivotally displaceable about an axis spaced from the silo and below the lower outlet end of the silage chute. The pivot supporting facilities for the deflector are therefore arranged to be connected to and engaged with the silo in straddling relation to the vertical wall section on which the ladder rungs are mounted just below the bottom of the silage chute that encloses and forms a passage about the vertical wall section.

An additional object of the present invention is to provide a silage deflector pivotally supported in spaced relation to the silo so that an elongated handle member pivotally connected thereto and projecting thereabove whereby a person within the silage chute either ascending or descending the ladder in the silo may selectively displace the deflector between a position engaging the vertical wall section of the silo on which the ladder is mounted to an inactive position spaced therefrom so as to unblock passage into the silage chute.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a partial transverse sectional view through a typical silo structure provided with the attachment of the present invention.

FIGURE 2 is a view taken substantially through a plane indicated by section line 2—2 in FIGURE 1.

FIGURE 3 is a partial side elevational view with parts shown in section showing the deflector in an inoperative or passage unblocking position.

FIGURE 4 is a perspective view illustrating the deflector.

FIGURE 5 is a perspective view illustrating one of the deflector mounting parts.

FIGURE 6 is a partial sectional view taken substantially through a plane indicated by section line 6—6 in FIGURE 1.

Referring now to the drawings in detail, it will be observed that the present invention is concerned with a silo generally referred to by the reference numeral 10 having a substantially cylindrical, vertical wall formed from edge abutting concrete staves 12 held together by encircling hoops 14. As is well known in the art, the encircling hoops 14 are connected at opposite terminal ends to spreader bars in the form of vertically elongated channel irons 16 which are spaced from each other by a vertical wall section 18 on which vertically spaced ladder rungs 20 are mounted. In this manner, a person is able to climb up along the vertical wall section 18 to any desired height or level in the silo. Accordingly, as is well known, the vertical wall section mounts at vertically spaced levels, doorways through which access to the silo is provided and from which silage stored in the silo may be dispensed into a vertical silage chute 22 that encloses the vertical wall section 18 to form a passageway for the silage. A person climbing or descending the vertical wall section must therefore enter into or exit from the passageway formed by the silage chute.

In accordance with the present invention, a deflector generally referred to by reference numeral 24 is mounted in close spaced adjacency below lower outlet end 26 of the silage chute so that silage may be deflected away from the silo at its base in order to deposit the silage, for example, at the inlet end of a feeder device. Toward this end, the deflector 24 is supported in engagement with the silo and at an angle thereto as illustrated in FIGURE 2. The deflector as more clearly seen in FIGURE 4, includes a bottom trough member 28 having upstanding side portions 30 to which a pair of side panel member 32 are secured. Connected to the bottom of the trough member 28 adjacent the lower outlet edge portion 34, is a pivot shaft 36 which projects laterally beyond the side portions 30. At its upper portion, the trough member 28 is provided with a wall engaging edge 38 adapted to abut the vertical wall section 18 between the projecting portions of the elongated angle members 16. Accordingly, a pair of bent tab portions 40 and 42 are provided on either side of the edge 38 so as to permit the edge 38 to abut against the vertical wall section when the deflector is in its operative position clearing the projecting leg portions of the angle members at 16 as more clearly seen in FIGURE 6. In this manner, loss of silage is prevented. The tab portion 42 is also provided with a pivot mounting 44 for an elongated handle member 46 which extends upwardly from the deflector to lie against either the vertical wall section 18 as shown in FIGURE 2 or against the wall of the silage chute 22 when the deflector is displaced to its passage unblocking position as illustrated in FIGURE 3.

The deflector is pivotally mounted for displacement between its operative and inactive positions at a location spaced from the silo wall by facilities that straddle the vertical wall section so that when the deflector is pivotally displaced out of engagement with the silo wall to the position illustrated in FIGURE 3, passage into the chute 22 will be unblocked. Pivotal support for the deflector is therefore provided by a pair of mounting assemblies 48 which engage and are connected to the silo on opposite sides of the vertical wall section 18. As more clearly seen in FIGURE 5, each mounting assembly 48 includes a pivot supporting member 50 which has a curved portion connected at its end to a pivot sleeve 52 adapted to rotatably receive one of the laterally projecting end portions of the pivot shaft 36 connected to the deflector 24. The other end of the pivot supporting member 50 is provided with an extensible silo engaging portion 54 adapted to engage the silo wall above a hoop 14 as more clearly seen in FIGURES 2 and 3. A set-screw 56 is provided so that the portion 54 may be adjustably extended for any desired distance to which location of the pivot sleeve 52 is to be adjusted. Secured to the member 50 adjacent to the pivot sleeve 52, is a hanger 58 which includes the straps 60 and 62 by means of which the hanger is adjustable in length by securing the straps 60 and 62 to each other by the fastener assembly 64 extending through selected apertures in the overlapping portions of the straps. The upper end of the strap 62 is provided with a hook portion 66 adapted to engage one of the hoops 14 so as to secure the mounting assembly 48 to the silo wall on opposite sides of the vertical wall section 18 in vertically spaced relation to the location at which the portions 54 engage the silo wall. Thus, by adjusting the length of the hangers 58 and the pivot supporting members, a triangular mounting support is formed establishing a pivotal supporting axis at any desired spacing from the silo wall below the outlet end 26 about which pivotal displacement of the deflector 24 may be effected between the operative and inactive positions aforementioned. The deflecting angle of the deflector when in the operative position may thereby be adjusted. Also, when in the operative position as seen in FIGURE 2, the deflector will engage the vertical wall section 18 between the hanger and pivot supporting members so that firm support for the deflector will be provided.

From the foregoing description, the construction, operation and purpose for the attachment of the present invention will be apparent. It will therefore be obvious, that loss-free deflection of silage dispensed from the bottom of the silage chute may be effected so that the silage may be deposited at some location spaced from the silo at its base. Nevertheless, passage into and out of the silage chute may readily be unblocked by merely pivotally displacing the deflector 24 from the position illustrated in FIGURE 2 to the position illustrated in FIGURE 3. When a person is descending, the deflector may be displaced from its operative position to the inactive position by merely grasping the elongated handle member 46 and pulling it upwardly so as to cause pivotal displacement of the deflector member in a counter-clockwise direction as viewed in FIGURES 2 and 3. Thus, a single person may control dispensing of silage even when inside the silage chute, without any assistance for unblocking the outlet end of the chute.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

In combination with a silo having a vertical wall section mounting ladder rungs an providing access at vertically spaced levels to the silo, a silage chute secured to the silo and enclosing said vertical wall section, a deflector mounted in close spaced adjacency below the silage chute, a pair of adjustably extensible pivot supporting members having opposite end portions pivotally connected to the deflector and engageable with the silo respectively in straddling relation to the vertical wall section, adjustable hanger straps secured to the pivot supporting members and connected to the silo in spaced relation above the pivot supporting members whereby a pivot for the deflector is established at a variable location for accommodating mounting of the defletor in accordance with dimensional requirements of the silo, and elongated handle means pivotally connected to the deflector and projecting into the silage chute for selectively displacing the deflector from a position engaging the vertical wall section of the silo between the hanger straps and the pivot supporting members to a position completely spaced from the silo to unblock passage into the silo chute thereabove.

References Cited by the Examiner

UNITED STATES PATENTS

| | | | |
|---|---|---|---|
| 1,028,831 | 6/12 | Stagg | 193—4 |
| 1,050,953 | 1/13 | Kint | 193—34 |
| 1,524,334 | 1/25 | Brown | 193—16 |
| 2,454,548 | 11/48 | Brinkert | 193—17 |
| 3,061,063 | 10/62 | Rutten | 193—17 |

SAMUEL F. COLEMAN, *Primary Examiner.*

ANDRES H. NIELSEN, *Examiner.*